Patented May 12, 1942

2,282,793

UNITED STATES PATENT OFFICE 2,282,793

FOOD

Sidney Musher, New York, N. Y., assignor to Musher Foundation Incorporated, New York, N. Y., a corporation of New York No Drawing. Application November 30, 1939, Serial No. 306,815

8 Claims. (Cl. 99—163)

This invention relates to the use of yeast, particularly brewer's dried yeast, which yeast has been heated to a sufficiently high temperature to kill the yeast cells and to inactivate those organisms which produce fermentation. The yeast is desirably filtered from the beer after the fermentation of the beer has been completed and is then dried.

The yeast freed of fermentative organisms is desirably used in curing operations such as in the curing of meats and fish and particularly fatty meats and fish, such as bacon, mackerel, salmon and tuna fish. The yeast may also be added to cream before pasteurizing, which cream is then churned to produce butter, or to fruit ice creams and particularly to strawberry ice cream.

Before addition, the yeast is filtered from the beer and is dried desirably at a temperature of over about 150° F. and preferably at some stage in the drying operation the temperature is increased to approximately 200° F. in order to kill off the fermentative organisms of the yeast.

There may also be utilized the water soluble constituents contained in yeast prepared by extracting the yeast in a slightly acidified water or alcohol and then concentrated after extraction to over about 50% total solids.

The water soluble extract of the yeast which is extracted by a slightly acidified water and at a temperature between about 125° F. and 145° F. is either before, during or after extraction rendered substantially free of fermentative organisms.

It is quite important that the extract after preparation from the yeast be concentrated to between 40% and 75% total solids or more.

The temperature of extraction may be between about 125° F. and 145° F. provided the fermentative organisms have already been killed off in the yeast. However, where there still remains any live cells in the yeast, the extraction should proceed for the shortest possible time such as for less than 30 minutes at a temperature of not in excess of about 115° F. and preferably at room temperature.

As an example of the method of preparing such extract from yeast, the yeast is desirably first pressed to a paste containing in excess of about 30% total solids or dried or the yeast may be extracted after having been skimmed off the fermented beer and then pressed to remove extraneous materials. The yeast is desirably finely macerated or ground in order to expose the yeast cells which may then be subjected to a sufficiently high temperature to kill off the fermentative organisms of the yeast. Preferably the yeast is heated in its moist condition to over 150° F. and desirably to about 200° F.

The yeast is then mixed or agitated thoroughly with a quantity of water for a period of about 30 minutes at a temperature of 135° F. The time of agitation may vary from 5 minutes to 2 hours but in order to obtain the maximum yield and the most desirable product, the time period for continuous agitation should be between about 45 minutes and 1 hour.

The temperature of the water at the time of the extraction should not be in excess of about 140° F. to 145° F. nor less than about 125° F. to 130° F.

The water used should be substantially free of minerals and desirably free of iron and copper. Where the water normally has a pH above 7.0, it should be acidified to reduce the pH. Preferably, in order to obtain a clear supernatant water containing the extract, and to obtain the most desirable type of extract, the pH of the water should be adjusted to between 4 and 7 and preferably to about 5 to 6 by addition of a mineral acid such as hydrochloric, sulphuric or phosphoric, or an organic acid such as acetic, tartaric, citric, etc., or by the addition of acid salts such as acid sulphates or phosphates. This adjustment may take place during or before the extraction. The pH adjustment will also serve to increase the rate at which insoluble material will settle out leaving a clear supernatant water portion containing the extract.

Any quantity of water may be used to produce a free flowing mixture. One part of yeast should preferably be mixed with about 4 parts of water by weight. Other proportions may also be used such as from 4 to 15 parts of water to every 1 part of yeast.

Another very satisfactory method is for the yeast to be ground or milled with sufficient water to produce a paste and whereby the cell structure of the yeast is so broken into as to permit the maximum solubility of the water extractable substances into the water. Then the pulpy aqueous mass may be pressed or centrifuged or otherwise treated to remove the aqueous solution containing the extract. Preferably the same temperature and acidity are employed as above. The solution may be clarified or filtered or where additional water is added, allowed to settle out.

Where the yeast-water suspension is allowed to stand for settling out, and after the 30 minute agitation and extraction period, the solution should desirably be cooled by placing it in a jacketed or coiled vat or by running water through cooling coils immersed therein or by adding cold water to the hot yeast-water suspension, so that the temperature of the water is reduced from 135° F. to from 80° F. to 105° F. and preferably to about 100° F. in order to avoid changes during the settling period. The solution thus cooled may then be treated to remove the yeast insoluble portions. This may be accomplished by allowing the solution to settle for from 2 to 12 hours until a substantially clear unfermented supernatant liquid is formed which liquid is removed by decanting, siphoning, or similar process.

The solution containing the yeast may also be subjected to a continuous centrifuging whereby all undissolved material is removed as a continuous operation.

The substantially clear solution thus obtained should desirably be evaporated by vacuum distillation at about 135° F. to approximately between 45% and 75% solids and desirably to about 70% solids and to a Baumé of 37°. After the proper solids content has been reached, the extract should desirably be subjected to superheated steam in the vacuum pan in order to raise the temperature of the extract to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated extract may also be packed in cans or other containers and sterilized at 220° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will avoid, to a large degree, such precipitation and coagulation.

Where drying is desirable, the concentrated water extract may be dried on trays, preferably under vacuum and a desirable dried product will be obtained. Drum drying is difficult in view of the mucilaginous nature of the extract by means of which the extract adheres to the drum and cannot readily be scraped off. Spray drying may less preferably be resorted to in view of the oxidation occurring during the spray drying operation.

A small quantity of the yeast and preferably its water extract in concentrated form may be added to cream containing between 30% and 35% of butterfat in its disperse phase and the cream then churned to produce butter, in which the yeast or the yeast extract is removed with the buttermilk leaving the butter substantially free of the added yeast material but nevertheless stabilized against oxidative deterioration.

*Example I*

Brewer's yeast was heated in its moist condition to 200° F. for 15 minutes in order to kill off the fermentative organisms. The yeast was then extracted for 1 hour using 5 parts of water to 1 part of yeast at a temperature of 135° F., and at a pH of 6, the water soluble portion being removed by filtration and then concentrated in a vacuum pan at 135° F. to about 70% solids or to a Baumé of 37°. 0.25% of this concentrated extract was added to a 35% butterfat containing cream and the cream then pasteurized and churned to produce butter. The butter was stored at 50° F. and compared in keeping quality with ordinary untreated butter to which no yeast extract had been added. An improvement of 1 point in the scoring of the butter was observed within 3 weeks which increased to about 1½ points after a 4 week period, over the untreated butter score.

The yeast or yeast extract may be added in any desirable amount but generally less than 2% and preferably under .5% is added. For all normal purposes, as little as from 0.05% to 0.5% may be added to cream in the manufacture of butter.

Similarly the yeast and its extract may be added in the brining or curing of meats, fish, olives and other food products and particularly of such fatty meats and fish as bacon, mackerel, herring, sardines, salmon and tuna fish.

For example, in the brining of mackerel or in the curing of fatty bacon, from 0.05% to 2% and preferably under about 1% of the yeast or its water extract may be added to the brine solution or with the other curing ingredients and rancidity of the bacon as well as of the salt mackerel will be very materially retarded.

*Example II*

The extract prepared as for Example I was admixed with salt in an amount of 5% against the weight of the salt. The salt containing the yeast extract was used in the curing of mackerel by rubbing the salt-extract combination over the mackerel and using 60% of the treated salt against the weight of the mackerel. The mackerel was observed at regular intervals in comparison with mackerel with which salt alone had been used in the curing and it was observed that the mackerel cured with the treated salt was free of rancidity for a period of over 3 months, whereas the mackerel cured with the untreated salt kept free from rancidity for a period of only about a month and a half.

The yeast extract may also be utilized in an amount of between about 1% and 15% on the basis of its total weight against the weight of the salt used in the brining or curing operations.

Particularly in the manufacture of the fruit ice creams such as strawberry ice cream, peach ice cream and pineapple ice cream, the yeast or its extract may be added to such ice cream mix to retard the development of oxidized off-flavors. In such ice creams, as little as 0.03% to 0.3% may be added and marked stabilization is observed.

*Example III*

To a strawberry ice cream mix was added 0.1% of a fermentative organism-free yeast powder. The strawberry ice cream mix was then frozen and held in storage at 15° F., being tasted at regular intervals for off-flavor developments. It was observed that the strawberry ice cream containing the yeast powder was substantially free of off-flavor development for a period of 5 weeks whereas a lot of strawberry ice cream to which yeast powder had not been added showed the off-flavor development within about 2½ weeks.

The extract of yeast may also be added to sizing baths used for the sizing of textiles, paper and board and particularly where the paper or board is used as wrappers for butter, lard, sliced bacon, biscuits and crackers.

It has been particularly found that where the yeast or its extract is added to an organic material subject to oxidation and that organic material containing the yeast or its extract thoroughly dispersed therein subjected to an elevated temperature in excess of about 170° F. and desirably to about 250° F. or above, marked improvement in keeping qualities is obtained.

For example, the yeast or its extract may be added to chopped hog fat and the chopped hog fat then rendered at a temperature of about 250° F. or above, or used in the rendering of tallow, oleo oil or lard at the elevated temperatures of rendering, or the extract may be added to cream which is then heated to about 180° F. and churned to produce butter.

In the manufacture of strawberry ice cream, it is desirable to add the yeast or its extract to the strawberry ice cream before the ice cream mix has been heated to 145° F. or above and it is particularly desirable for the yeast to be added to the cream used in the manufacture of the ice cream and the cream then heated to about 170° F. to 180° F. and such cream then used in the manufacture of the strawberry ice cream.

In the treatment of glyceride oils and fats such as lard, tallow, oleo oil, cottonseed oil, corn oil, soya bean oil, castor oil, cod liver oil, tea seed oil, olive oil or other animal or vegetable oil or fat either in substantially crude, refined or hydrogenated condition, it is desirable to use the finely divided yeast itself, adding the yeast, with its fermenting organisms having already been killed off, in an amount of between 0.05% and 5% and thoroughly admixing the yeast in the oil or fat.

*Example IV*

To bleached refined lard was added 0.1% of fermentative organism-free brewer's yeast powder. The yeast powder was thoroughly mixed in the lard and the lard tested on the "Swift Stability Apparatus" by means of which air is bubbled thorugh a 20 cc. sample of lard at 208° F. until rancidity is observed. The results obtained were as follows:

*Rancid after—*
Untreated lard _____ 1 hour
Treated lard _____ 4½ hours

*Example V*

Chopped hog fat was rendered at 260° F. for 3 hours. To the chopped hog fat was added before rendering 0.1% of fermentative organism-free brewer's yeast powder and thoroughly admixed with the chopped hog fat in the rendering kettle. The lard which was rendered was compared in keeping quality with lard prepared from a similar lot of chopped hog fat to which no yeast powder had been added.

*Rancid after—*
Lard from untreated chopped hog fat____ 2 hours
Lard from treated chopped hog fat_____ 11 hours Where the fat such as lard is to be used in the manufacture of bread and where it is desired to retain the fermentative organisms, the yeast may be, desirably in dried condition or in dehydrated condition, admixed with the lard in an amount of under about 10% and the lard then serves as the carrier for the yeast which may be used in the manufacture of bread. Under these circumstances, it has been observed that the fermentative organisms will have been better preserved during normal distribution or storage periods and without requiring the same care that is needed where the yeast itself is to be held. Preferably, however, the fermentative organisms have been killed off.

As indicated above, where the yeast extract or the yeast powder with its fermentative organisms killed off has been added to a substantially pure glyceride such as to lard, cottonseed oil, olive oil, etc., it is desirable for the oil following the addition of the yeast thereto to be subjected to an elevated temperature in excess of about 170° F. and desirably to 250° F. or over.

Another feature of the present invention is that the yeast powder or its extract may, for example, be dissolved or dispersed in a concentrated sugar solution such as in molasses, as refinery or crude blackstrap or sorghum or beet molasses, and the molasses or concentrated crude sugar solution containing the yeast then serving as the continuous phase for the dispersion of a vitamin containing oil therein such as for dispersing cod liver oil, halibut liver oil, or other vitamin containing oil in the molasses containing the yeast. Under these circumstances, the cod liver oil or other vitamin containing oil is very materially improved in keeping quality. For example, a mixture may be prepared comprising 5% of the yeast in molasses and the molasses containing the 5% of yeast then used as the aqueous continuous phase for the dispersion of about 15% of cod liver oil which cod liver oil may be homogenized in the molasses containing the yeast. Desirably, the mixture is then subjected to an elevated temperature of 250° F. or above.

In the preparation of the water extract of the yeast, where desired a carrier may be employed in the drying of the extract. For example, the concentrated water extract of the yeast may be mixed with condensed skim milk, on the basis of using from 5% to 60% by weight of the extract (on its solids basis) against the solids weight of the skim milk and the thoroughly mixed combination of the extract and skim milk dried on a drum drier or otherwise dried. The skim milk absorbs the gummy characteristics of the extract and permits much easier drying than where the extract is dried alone.

There is obtained a combined action of the milk ingredients with the extract to further increase the stabilizing action of the extract. The drying may be done preferably on a hot roll and the dried film scraped off after drying. Less preferably the mixture may be dried by spraying into a heated chamber.

This dried combination may then very desirably be utilized for addition to dairy products such as for addition to an ice cream mix, to cream in the manufacture of butter, or to market milk in an amount of between 0.1% and 5%, for example, or for use in the manufacture of sausage or other oxidizable food compositions. Where desired, as little as 0.5% of the extract on its solids basis may be combined with the skim milk on its solids basis.

Other carriers may also be employed and particularly salt and sugar. The extract may, for example, be mixed with salt or sugar using from 1% to 20% of the extract and 99% to 80% of the salt or sugar and preferably applying the concentrated extract to the sugar or salt crystals by spraying such extract on the crystals while they are kept at above 180° F. and desirably at between 250° F. and 300° F. so that the extract dries on the surface of the crystals of the salt or sugar.

For example, as the salt crystals leave the kiln at 275° F., the extract containing 30% water may be heated to 170° F. and sprayed on the salt crystals, applying 2% on the solids basis to the salt in this manner, thereby obtaining a completely soluble product. The extract may be applied to sugar such as to refined cane or beet sugar or to dextrose at the centrifugals to obtain complete admixture with and absorption upon the sugar crystals.

By applying the extract to sugar particularly, either in crystalline form or as a concentrated solution, a sugar preparation is obtained which may be utilized particularly when subjected to elevated temperatures in oxidizable food compositions, such as for addition to dairy products, candies and confections, beverages such as Coca-Cola and other fruit drinks, orange juice, lemon juice, in the canning of fruits, etc., and particularly where the sugar containing the extract is heated to a temperature of about 250° F. or above after addition to the food.

Similarly, the treated salt may be used in the manufacture of butter in place of ordinary salt or in curing or brining operations such as in the curing or brining of meats, fish and olives and particularly of fatty meats and fish.

Alcohol may also be used as the extractant from the yeast which has been freed of fermentative organisms and particularly the lower molecular weight alcohols which have been slightly acidified and with or without a small quantity of water also present at the time of extraction.

The extract may also be mixed with fully water miscible or partly water miscible organic solvents such as, for example, acetone, or alcohols and particularly the higher molecular weight aliphatic alcohols such as butyl alcohol, to precipitate and remove undesirable materials. If desired, it is also possible, although less preferable, to use a mixture of water and these organic solvents as extracting agents, preferably in slightly acidified condition. Or, on the other hand, the organic solvents themselves may be utilized as the extractant following which they may be evaporated to obtain the concentrate or mixed with water to precipitate therefrom materials not desired in the final concentrate.

The yeast that is utilized in accordance with this invention is preferably brewer's yeast or yeast obtained during the manufacture of beer although yeast obtained from the manufacture of alcohol by molasses fermentation or in distillery operations may also be utilized. Both "top yeast" and "bottom yeast" may be employed.

Dried grains containing high proportions of yeast but freed of fermentative organisms or their extracts may also be employed in a similar manner although brewer's yeast is preferable.

It is also possible to form combinations in dry or paste form of the yeast or its extracts with a phosphatide of animal or vegetable origin such as lecithin or cephalin and/or with a sugar such as dextrose or sucrose in amounts of from 1 to 5 parts of the yeast or its extract with from 5 to 1 parts of the phosphatide and/or sugar and then after adding such combination to an oil, particularly a glyceride oil or oil containing composition, followed by heating to over 170° F. and preferably to 250° F. in order to obtain enhanced stability.

In lieu of or in addition to the use of yeast, it is possible, but less preferable to utilize fungi such as mushrooms and their extracts prepared as described.

It is desirable for the yeast or its extract to be added in an amount insufficient to produce any yeast odor or flavor in the food, such as in the butter, bacon or strawberry ice cream, and generally the amount used will be less than about 1%.

Zymase may also be utilized, particularly in its inactive form and after having been subjected to the elevated temperature of inactivation, and preferably in combination with a sugar and where subjected to an elevated temperature of over 170° F. and desirably over 250° F. after addition to the oxidizable composition.

The present application is a continuation in part of applications, Serial No. 301,758 filed October 28, 1939, now Patent No. 2,198,205 and Serial No. 301,757 filed October 28, 1939, now Patent No. 2,198,206 and through said applications continues the subject matter of applications, Serial No. 268,341 filed April 17, 1939, now Patent No. 2,176,024, Serial No. 249,990 filed January 9, 1939, now Patent No. 2,176,027, and Serial No. 229,296 filed September 10, 1938, now Patent No. 2,176,028.

Having described my invention, what I claim is:

1. A method of treating food compositions to stabilize them against oxidative deterioration which comprises adding thereto a relatively small proportion of a material selected from the group consisting of inactivated yeast and its water and alcohol soluble extracts.

2. A method of treating food compositions to stabilize them against oxidative deterioration which comprises adding thereto a relatively small proportion of a slightly acidified water soluble extract of inactivated yeast.

3. A method of treating glyceride oil containing food compositions to stabilize them against oxidative deterioration which comprises adding thereto a small proportion of finely divided inactivated yeast.

4. A method of treating a glyceride oil to stabilize it against oxidative deterioration which comprises adding thereto finely divided dried inactivated yeast.

5. A method of treating food compositions to stabilize them against oxidative deterioration which comprises adding thereto a relatively small proportion of a material selected from the group consisting of inactivated yeast and its water and alcohol soluble extracts, and then heating the composition to a temperature in excess of 170° F. whereby enhanced stabilization is obtained.

6. A food composition stabilized against oxidative deterioration, said food composition containing a small amount of a material selected from the group consisting of inactivated yeast and its water and alcohol soluble extracts as the stabilizing agent.

7. A glyceride oil containing food composition stabilized against oxidative deterioration, said food composition containing a small amount of inactivated yeast as the stabilizing agent.

8. A glyceride oil stabilized against oxidative deterioration, said glyceride oil containing a small amount of dried inactivated yeast as the stabilizing agent.

SIDNEY MUSHER.